United States Patent
Demirors et al.

(10) Patent No.: US 10,730,987 B2
(45) Date of Patent: Aug. 4, 2020

(54) PROCESS FOR PRODUCING FUNCTIONALIZED ETHYLENE-BASED POLYMERS WITH A LOW GEL CONTENT

(71) Applicant: Dow Global Technologies LLC, Midland, MI (US)

(72) Inventors: Mehmet Demirors, Freeport, TX (US); Sean Ewart, Freeport, TX (US); Teresa P. Karjala, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 95 days.

(21) Appl. No.: 16/072,323

(22) PCT Filed: Jan. 26, 2017

(86) PCT No.: PCT/US2017/015078
§ 371 (c)(1),
(2) Date: Jul. 24, 2018

(87) PCT Pub. No.: WO2017/132338
PCT Pub. Date: Aug. 3, 2017

(65) Prior Publication Data
US 2019/0031806 A1   Jan. 31, 2019

Related U.S. Application Data

(60) Provisional application No. 62/288,017, filed on Jan. 28, 2016.

(51) Int. Cl.
| | | |
|---|---|---|
| *C08K 5/01* | (2006.01) | |
| *C08F 255/02* | (2006.01) | |
| *C08F 222/06* | (2006.01) | |
| *C08K 5/14* | (2006.01) | |
| *C08K 5/23* | (2006.01) | |
| *C08F 210/16* | (2006.01) | |

(52) U.S. Cl.
CPC .......... *C08F 255/02* (2013.01); *C08F 222/06* (2013.01); *C08K 5/01* (2013.01); *C08K 5/14* (2013.01); *C08K 5/23* (2013.01); *C08F 210/16* (2013.01)

(58) Field of Classification Search
CPC .... C08F 222/06; C08F 255/02; C08F 210/15; C08K 5/01; C08K 5/14
See application file for complete search history.

(56) References Cited

U.S. PATENT DOCUMENTS

| | | |
|---|---|---|
| 4,751,270 A | 6/1988 | Urawa et al. |
| 5,268,440 A | 12/1993 | Luft et al. |
| 6,967,229 B2 | 11/2005 | Voorheis |
| 9,045,628 B2 | 6/2015 | Ewart et al. |
| 9,975,975 B2* | 5/2018 | Ewart et al. .......... C08F 210/16 |
| 2006/0047049 A1 | 3/2006 | Onishi et al. |
| 2010/0108357 A1 | 5/2010 | Smedberg et al. |
| 2013/0287985 A1 | 10/2013 | Demirors et al. |
| 2017/0362419 A1 | 12/2017 | Karjala et al. |

FOREIGN PATENT DOCUMENTS

| | | |
|---|---|---|
| EP | 0273274 A2 | 7/1988 |
| GB | 1565347 A | 4/1980 |

* cited by examiner

*Primary Examiner* — Nathan M Nutter
(74) *Attorney, Agent, or Firm* — Quarles & Brady LLP

(57) ABSTRACT

Functionalized ethylene-based polymers are prepared by a process comprising the step of reacting a first composition comprising an ethylene-based polymer with at least the following: (A) at least one carbon-carbon (C—C) free radical initiator of Structure I: wherein $R_1$, $R_2$, $R_3$, $R_4$, $R_5$ and $R_6$ are each, independently, hydrogen or a hydrocarbyl group; and wherein, optionally, two or more R groups ($R_1$, $R_2$, $R_3$, $R_4$, $R_5$ and $R_6$) form a ring structure; and with the provisos that (i) at least one of $R_2$ and $R_5$ is a hydrocarbyl group of at least two carbon atoms, and (ii) at least one of $R_3$ and $R_6$ is a hydrocarbyl group of at least two carbon atoms; and (B) at least one free radical initiator other than the carbon-carbon (C—C) free radical initiator of Structure I (a non-C—C free radical initiator), e.g., a peroxide; and (C) at least one functionalization agent, e.g., maleic anhydride.

(Structure I)

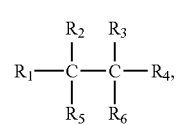

10 Claims, 1 Drawing Sheet

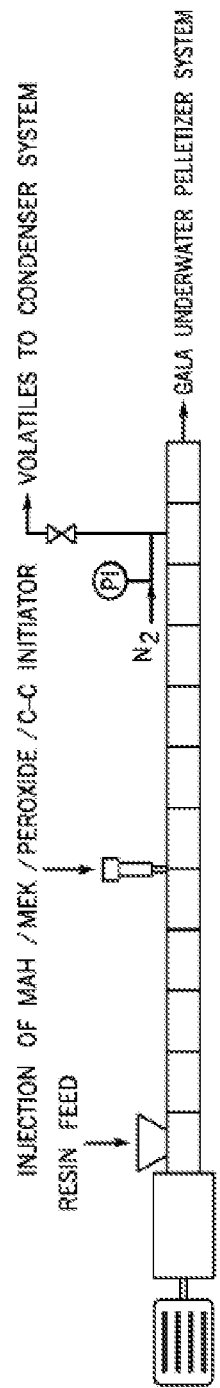

PROCESS FOR PRODUCING FUNCTIONALIZED ETHYLENE-BASED POLYMERS WITH A LOW GEL CONTENT

REFERENCE TO RELATED APPLICATIONS

The present application claims the benefit of U.S. Provisional Application 62/288,017, filed on Jan. 28, 2016, and incorporated herein by reference.

BACKGROUND OF THE INVENTION

Functionalized ethylene-based polymers are ethylene-based polymers, e.g., homopolymers of ethylene such as high density polyethylene (HDPE), high pressure low density polyethylene (LDPE), etc., or copolymers of ethylene and one or more C3-C20 alpha olefins such as copolymers of ethylene and propylene, or 1-butene, or 1-hexene, or 1-octene, etc., with one or more functionalization agents, e.g., maleic anhydride (MAH), etc., bonded to the backbone of the ethylene-based polymer. One example of a commercially available functionalized ethylene-based polymer is the family of AMPLIFY™ GR functional polymers, e.g., maleic anhydride (MAH) grafted polyethylene (MAH-g-polyethylene).

In a typical preparation of a functionalized ethylene-based polymer, an ethylene-based polymer is contacted with a functionalization agent under grafting conditions. These conditions typically include the use of a free radical initiator, e.g., a peroxide or azo compound. These materials are typically contacted with one another at an elevated temperature in a reaction vessel such as an extruder. While effective, this process typically produces a final product of a functionalized ethylene-based polymer containing gels that are the result of crosslinking due to the premature activation of the free radical initiator. Ideally, the ethylene-based polymer, functionalization agent and free radical initiator are mixed with one another for an extended period of time to produce a homogenous reaction mass before the initiator is activated, but often at least some of the initiator is activated due to either the shear forces generated within the extruder or reaching the initiator activation temperature before a homogeneous reaction mass is obtained and this, in turn, allows the ethylene-based polymer to crosslink as opposed to react with the functionalization agent. Depending upon the nature and amount of gels in a functionalized ethylene-based polymer, the polymer may well be unsuited for its intended purpose.

SUMMARY OF THE INVENTION

In one embodiment the invention is a process to form a composition comprising a functionalized ethylene-based polymer, the process comprising reacting a first composition comprising an ethylene-based polymer with at least the following:

(A) at least one carbon-carbon (C—C) free radical initiator of Structure I:

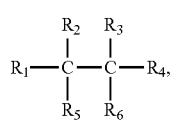

(Structure I)

wherein $R_1$, $R_2$, $R_3$, $R_4$, $R_5$ and $R_6$ are each, independently, hydrogen or a hydrocarbyl group; and wherein, optionally, two or more R groups ($R_1$, $R_2$, $R_3$, $R_4$, $R_5$ and $R_6$) form a ring structure; and with the provisos that (i) at least one of $R_2$ and $R_5$ is a hydrocarbyl group of at least two carbon atoms, and (ii) at least one of $R_3$ and $R_6$ is a hydrocarbyl group of at least two carbon atoms; and (B) at least one free radical initiator (a non-C—C free radical initiator) other than the carbon-carbon (C—C) free radical initiator of Structure I; and (C) at least one functionalization agent.

BRIEF DESCRIPTION OF THE DRAWINGS

The FIGURE is a schematic layout of a ZSK-25 extruder system used to produce MAH-g-polyethylene.

DETAILED DESCRIPTION OF THE PREFERRED EMBODIMENT

As discussed above, a process is provided to form a composition comprising a functionalized ethylene-based polymer, the process comprising reacting a first composition comprising an ethylene-based polymer with at least the following:

(A) at least one carbon-carbon (C—C) free radical initiator of Structure I:

(Structure I)

wherein $R_1$, $R_2$, $R_3$, $R_4$, $R_5$ and $R_6$ are each, independently, hydrogen or a hydrocarbyl group; and wherein, optionally, two or more R groups ($R_1$, $R_2$, $R_3$, $R_4$, $R_5$ and $R_6$) form a ring structure; and with the provisos that (i) at least one of $R_2$ and $R_5$ is a hydrocarbyl group of at least two carbon atoms, and further an aliphatic hydrocarbyl group of at least two carbon atoms, and further an alkyl group of at least two carbon atoms, and (ii) at least one of $R_3$ and $R_6$ is a hydrocarbyl group of at least two carbon atoms, and further an aliphatic hydrocarbyl group of at least two carbon atoms, and further an alkyl group of at least two carbon atoms; and (B) at least one free radical initiator (a non-C—C free radical initiator) other than the carbon-carbon (C—C) free radical initiator of Structure I; and (C) at least one functionalization agent.

In an embodiment the at least one non-C—C free radical initiator is a peroxide. In an embodiment the at least one non-C—C free radical initiator is a peroxide, such as LUPEROX™ 101 available from Sigma Aldrich.

In one embodiment, the C—C free-radical initiator is present in an amount ≥0.001 grams per kilogram (g/kg), further greater than 0.005 grams per kilogram, further greater than 0.008 grams per kilogram, further greater than 0.01 grams per kilogram, of the ethylene-based polymer. In one embodiment, the C—C free-radical initiator is present in an amount ≤4.00 grams per kilogram (g/kg), further ≤3.00 grams per kilogram, further ≤2.00 grams per kilogram, further ≤1.00 grams per kilogram, of the ethylene-based polymer.

In one embodiment, the non-C—C free-radical initiator is present in an amount greater than, or equal to, 0.001 grams per kilogram (g/kg), further greater than 0.005 grams per kilogram, further greater than 0.008 grams per kilogram, further greater than 0.01 grams per kilogram, of the ethylene-based polymer. In one embodiment, the non-C—C free-radical initiator is present in an amount ≤3.00 grams per kilogram (g/kg), further ≤2.00 grams per kilogram, further ≤1.00 grams per kilogram, further ≤0.50 grams per kilogram, of the ethylene-based polymer.

In one embodiment the C—C free radical initiator and non-C—C free radical initiator are typically present, in the process of this invention, at a C—C initiator to non-C—C initiator weight ratio from 5.0 to 1.0, more typically from 2.0 to 1.0 and even more typically from 1.5 to 1.0.

In one embodiment, the C—C free radical initiator of component (A) and non-C—C free radical initiator of component (B) are present at a C—C initiator to non-C—C initiator weight ratio from 3.0 to 0.5, or from 2.5 to 0.5, or from 2.2 to 0.5, or from 2.1 to 0.5. In one embodiment, the C—C free radical initiator of component (A) and non-C—C free radical initiator of component (B) are present at a C—C initiator to non-C—C initiator weight ratio from 3.0 to 0.6, or from 2.5 to 0.7, or from 2.2 to 0.8, or from 2.1 to 0.9.

In one embodiment the total amount of free radical initiator used in the practice of this invention, i.e., the combined amount of all C—C free radical initiators and all non-C—C free radical initiators, is from greater than, or equal to, 0.002 grams per kilogram (g/kg) to less than, or equal to, 4.0 g/kg or 3.0 g/kg; or from greater than, or equal to, 0.01 g/kg to less than, or equal to, 3 g/kg; or from greater than, or equal to, 0.05 g/kg to less than, or equal to, 0.2 g/kg; or from greater than, or equal to, 0.5 g/kg to less than, or equal to, 1.7 g/kg. Here, g of free radical initiator(s) per kg of the ethylene-based polymer is in the context of the first composition.

In one embodiment the ethylene-based polymer, C—C free radical initiator, non-C—C free radical initiator, and functionalization agent are contacted with one another in a reaction vessel and at grafting conditions. In one embodiment the reaction vessel is an extruder. In one embodiment the grafting conditions include a temperature in the range from 100 to 300° C., or from 150 to 250° C., or from 170 to 230° C.

In one embodiment, the C—C free-radical initiator has a decomposition temperature of greater than, or equal to, (≥)125° C., or ≥130° C., or ≥150° C., or ≥180° C., or ≥200° C., or ≥250° C., based on DSC measurements.

In one embodiment, the C—C free-radical initiator has a decomposition temperature of greater than, or equal to, (≥)125° C., or ≥130° C., or ≥135° C., or ≥140° C., or ≥145° C., or ≥150° C., based on DSC measurements. In one embodiment, the C—C free-radical initiator has a decomposition temperature of less than, or equal to, (≤)230° C., or ≤225° C., or ≤220° C., or ≤215° C., or ≤210° C., or ≤205° C., based on DSC measurements.

In one embodiment, the process comprises contacting the ethylene-based polymer with at least two C—C free-radical initiators.

In one embodiment, for Structure I, $R_1$ and $R_4$ are phenyl.

In one embodiment, for Structure I, the at least one C—C free radical initiator is selected from the group consisting of 3,4-diethyl-3,4-diphenyl hexane and 3,4-dipropyl-3,4-diphenyl hexane.

In one embodiment, the melt index ($I_2$, 190° C./2.16 kg) of the ethylene-based polymer, before contact with the free radical initiators of (A) and (B) and the functionalization agent of (C), is from 0.1 to 1500 g/10 min, or from 0.5 to 100, or from 0.5 to 50 g/10 min, or from 1 to 20 g/10 min, or from 3 to 10 g/10 min. In one embodiment, the ethylene-based polymer, before contact with the free radical initiators of (A) and (B) and the functionalization agent of (C), has a density from 0.860 to 0.970 g/cc, or from 0.860 to 0.930 g/cc, or from 0.860 to 0.900 g/cc, or from 0.865 to 0.890 g/cc.

In one embodiment, the ethylene-based polymer, before contact with the free radical initiators of (A) and (B) and the functionalization agent of (C), has a molecular weight distribution, determined by GPC (Gel permeation Chromatography), from 1.5 to 20, or from 1.5 to 5.0, or from 1.7 to 3.0, or from 1.8 to 2.2.

In one embodiment, the ethylene-based polymer, before contact with the free radical initiators of (A) and (B) and the functionalization agent of (C), is an ethylene-alpha-olefin interpolymer. In one embodiment the ethylene-alpha-olefin interpolymer, before contact with the free radical initiators of (A) and (B) and the functionalization agent of (C), has at least one of the following: (1) a density of from 0.860 to 0.970 g/cc, or from 0.860 to 0.930 g/cc, or from 0.860 to 0.900 g/cc, or from 0.865 to 0.890 g/cc, and/or (2) a melt index ($I_2$, 190° C./2.16 kg) from 0.1 to 1500 g/10 min, or from 0.5 to 100, or from 0.5 to 50 g/10 min, or from 1 to 20 g/10 min, or from 3 to 10 g/10 min. In one embodiment the alpha-olefin unit of the ethylene-alpha-olefin interpolymer is derived from at least one of a C3-C10 alpha-olefin, for example propylene, 1-butene, 1-hexene or 1-octene.

In one embodiment, the ethylene-based polymer, before contact with the free radical initiators of (A) and (B) and the functionalization agent of (C), is an ethylene-alpha-olefin copolymer. In one embodiment the ethylene-alpha-olefin copolymer, before contact with the free radical initiators of (A) and (B) and the functionalization agent of (C), has at least one of the following: (1) a density of from 0.860 to 0.970 g/cc, or from 0.860 to 0.930 g/cc, or from 0.860 to 0.900 g/cc, or from 0.865 to 0.890 g/cc, and/or (2) a melt index ($I_2$, 190° C./2.16 kg) from 0.1 to 1500 g/10 min, or from 0.5 to 100, or from 0.5 to 50 g/10 min, or from 1 to 20 g/10 min, or from 3 to 10 g/10 min. In one embodiment the alpha-olefin unit of the ethylene-alpha-olefin copolymer is derived from at least one of a C3-C10 alpha-olefin, for example, propylene, 1-butene, 1-hexene or 1-octene.

In one embodiment, the ethylene-based polymer, before contact with the free radical initiators of (A) and (B) and the functionalization agent of (C), is a low density polyethylene (LDPE).

In one embodiment, the ethylene-based polymer, before contact with the free radical initiators of (A) and (B) and the functionalization agent of (C), is a linear low density polyethylene (LLDPE).

In one embodiment, the invention is a process combining two or more of the previous embodiments.

In one embodiment, the invention is a composition comprising the functionalized ethylene-based polymer made by the process of this invention.

In one embodiment, the invention is a composition comprising (i) a functionalized ethylene-based polymer made by the process of this invention, and (ii) one or more additives.

In one embodiment, the functionalized ethylene-based polymer, made by the process of this invention, has a tan delta at 190° C. at 0.1 rad/s of less than 40, or less than 30, or less than 20, or less than 15, or less than 10.

In one embodiment, the functionalized ethylene-based polymer, made by the process of this invention, has a viscosity ratio, at 190° C., of the viscosity at 0.1 rad/s to the viscosity at 100 rad/s, of greater than 2.5, or greater than 3.0, or greater than 3.5, or greater than 4.0.

In one embodiment, the functionalized ethylene-based polymer, made by the process of this invention, has a melt index at 190° C. and 2.16 kg, of less than 5 g/10 min, or less than 4 g/10 min, or less than 3 g/10 min or less than 2 g/10 min.

In one embodiment, the functionalized ethylene-based polymer, made by the process of this invention, has both (1) a GI 200 of less than 12, or less than 10, or less than 9, or less than 8, or less than 7 (film thickness of 76±5 microns), and (2) an MAH wt % amount of at least 0.2%, or of at least 0.3%, or of at least 0.4%, or of at least 0.5%, or of at least 0.6%, or of at least 0.7%, or of at least 0.8% based on the weight of the functionalized polymer.

In one embodiment, the functionalized ethylene-based polymer is a functionalized ethylene-alpha-olefin interpolymer. In one embodiment the alpha-olefin unit of the functionalized ethylene-alpha-olefin interpolymer is derived from a C3-C10 alpha-olefin, for example propylene, 1-butene, 1-hexene or 1-octene. In one embodiment, the functionalized ethylene-based polymer is a functionalized ethylene-alpha-olefin copolymer. In one embodiment the alpha-olefin unit of the functionalized ethylene-alpha-olefin copolymer is derived from a C3-C10 alpha-olefin. In a further embodiment, the alpha-olefin is selected from propylene, 1-butene, 1-hexene or 1-octene.

In one embodiment, the functionalized ethylene-based polymer is a functionalized low density polyethylene.

In one embodiment, the functionalized ethylene-based polymer is a functionalized linear low density polyethylene.

An inventive composition may comprise a combination of two or more embodiments as described herein.

The ethylene-based polymer may comprise a combination of two or more embodiments described herein. The functionalized ethylene-based polymer may comprise a combination of two or more embodiments described herein.

In one embodiment, the invention is a composition comprising the functionalized ethylene-based polymer of this invention.

In one embodiment, the "composition comprising the functionalized ethylene-based polymer" of this invention, also comprises one or more olefin-based polymers.

The invention also provides an article comprising at least one component formed from an inventive composition as described herein. In a further embodiment, the article is a film, a coating, or an injection molded part, and further a film or coating. An inventive article may comprise a combination of two or more embodiments as described herein.

In one embodiment, the "composition comprising the functionalized ethylene-based polymer" has a GI 200 gel content less than, or equal to, 40, or less than, or equal to, 30, or less than, or equal to, 20, or less than, or equal to, 15, or less than, or equal to, 12, or less than, or equal to, 10, as determined by the GI200 test method with a film thickness of 76±5 microns. In one embodiment, the "composition comprising the functionalized ethylene-based polymer" has a GI 200 gel content less than, or equal to, 12, or less than, or equal to, 10, or less than, or equal to, 8, or less than, or equal to, 6, or less than, or equal to, 5, as determined by the GI 200 test method with a film thickness of 76±5 microns.

In one embodiment, the functionalization is derived from a functionalization agent comprising an anhydride group. In a further embodiment, the functionalization agent is maleic anhydride.

In one embodiment, the functionalized ethylene-based polymer has a functionalization amount ≥0.2 wt %, further ≥0.4 wt %, further ≥5 wt %, further ≥0.6 wt %, further ≥7 wt %, further ≥0.8 wt %, based on the weight of the functionalized ethylene-based polymer. In a further embodiment, the functionalization is derived from a functionalization agent comprising an anhydride group. In a further embodiment, the functionalization agent is maleic anhydride.

In one embodiment, the "composition comprising the functionalized ethylene-based polymer" has a GI 200 gel content less than, or equal to, 40, or less than, or equal to, 30, or less than, or equal to, 20, or less than, or equal to, 15, or less than, or equal to, 12, or less than, or equal to, 10, as determined by the GI 200 test method with a film thickness of 76±5 microns. In a further embodiment, the functionalized ethylene-based polymer has a functionalization amount ≥0.2 wt %, further ≥0.4 wt %, further ≥0.5 wt %, further ≥0.6 wt %, further ≥0.7 wt %, further ≥0.8 wt %, based on the weight of the functionalized ethylene-based polymer. In a further embodiment, the functionalization is derived from a functionalization agent comprising an anhydride group. In a further embodiment, the functionalization agent is maleic anhydride.

In one embodiment, the "composition comprising the functionalized ethylene-based polymer" has a gel content less than or equal to 3500, or less than, or equal to, 2000, or less than, or equal to, 1500, as determined by the "200 micron category," or between 150 and 200 microns, with a film thickness of 76±5 microns.

In one embodiment, the "composition comprising the functionalized ethylene-based polymer" has a gel content less than, or equal to, 2250, or less than, or equal to, 2000, or less than, or equal to, 1500, as determined by the "400 micron category," or between 200 and 400 microns, with a film thickness of 76±5 microns.

In one embodiment, the "composition comprising the functionalized ethylene-based polymer" has a gel content less than, or equal to, 300, or less than, or equal to, 275, or less than, or equal to, 250, as determined by the "800 micron category," or between 400 and 800 microns, with a film thickness of 76±5 microns.

An inventive composition may comprise a combination of two or more embodiments as described herein.

C—C Free Radical Initiators

The carbon-carbon ("C—C") initiators used in the practice of this invention comprise only carbon and hydrogen, and have Structure I:

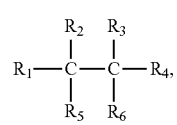

(Structure I)

wherein $R_1$, $R_2$, $R_3$, $R_4$, $R_5$ and $R_6$ are each, independently, hydrogen or a hydrocarbyl group and wherein, optionally, two or more R groups ($R_1$, $R_2$, $R_3$, $R_4$, $R_5$ and $R_6$) form a ring structure, with the provisos that at least one of $R_2$ and $R_5$, and at least one of $R_3$ and $R_6$ is a hydrocarbyl group of at least two carbon atoms, and further an aliphatic hydrocarbyl group of at least two carbon atoms, and further an alkyl group of at least two carbon atoms.

In one embodiment, one or more of the $R_1$-$R_6$ groups are aliphatic hydrocarbyl groups.

In one embodiment, one or more of the $R_1$-$R_6$ groups are alkyl.

In one embodiment, one or more of the $R_1$-$R_6$ groups are aryl.

In one embodiment, two or more of the $R_1$-$R_6$ groups are aryl.

In one embodiment, $R_1$ and $R_4$ are aryl, preferably phenyl.

In one embodiment, $R_1$ and $R_4$ are aryl, and one of $R_2$ and $R_5$, and one of $R_3$ and $R_6$ is hydrogen.

In one embodiment, $R_1$ and $R_4$ are aryl, and one of $R_2$ and $R_5$ and one of $R_3$ and $R_6$ is a $C_2$-$C_{10}$ alkyl and the other of $R_2$ and $R_5$ and the other of $R_3$ and $R_6$ is hydrogen.

In one embodiment, at least one of $R_2$ and $R_5$ is a C2-C10 alkyl group, or a C2-C8 alkyl group, or a C2-C6 alkyl group, or a C2-C4 alkyl group, or a C2-C3 alkyl group, or a C2 alkyl group. In one embodiment, both $R_2$ and $R_5$ are each, independently, a C2-C10 alkyl group, or a C2-C8 alkyl group, or a C2-C6 alkyl group, or a C2-C4 alkyl group, or a C2-C3 alkyl group, or a C2 alkyl group.

In one embodiment, at least one of $R_3$ and $R_6$ is a C2-C10 alkyl group, or a C2-C8 alkyl group, or a C2-C6 alkyl group, or a C2-C4 alkyl group, or a C2-C3 alkyl group, or a C2 alkyl group. In one embodiment, both $R_3$ and $R_6$ are each, independently, a C2-C10 alkyl group, or a C2-C8 alkyl group, or a C2-C6 alkyl group, or a C2-C4 alkyl group, or a C2-C3 alkyl group, or a C2 alkyl group.

In one embodiment $R_1$ and $R_4$ are the same or different aryl radicals. In a further embodiment, $R_1$ and $R_4$ are each phenyl, e.g., Structure II; and wherein $R_2$, $R_3$, $R_5$ and $R_6$ are each as described above:

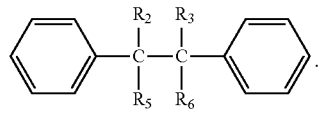

(Structure II)

In one embodiment, $R_2$-$R_3$ and $R_5$-$R_6$ are the same or different alkyl radicals, more preferably the same or different $C_{1-6}$ alkyl radicals, and even more preferably the same $C_{1-4}$ straight chain alkyl radical. Representative C—C initiators include, but are not limited to, the following Structures III-VIII, as follows: 3,4-dimethyl-3,4-diphenyl hexane (Structure III):

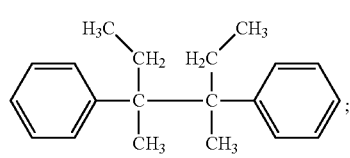

(Structure III)

and, 3,4-diethyl-3,4-diphenyl hexane (Structure IV):

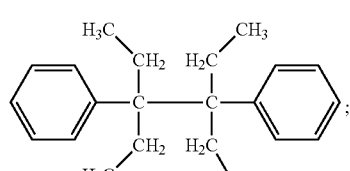

(Structure IV)

2,7-dimethyl-4,5diethyl-4,5-diphenyl octane (DBuDPH) (Structure V):

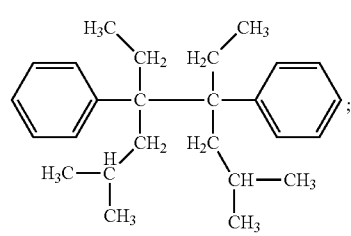

(Structure V)

3,4-dibenzyl-3,4-ditolyl hexane (DBnDTH) (Structure VI):

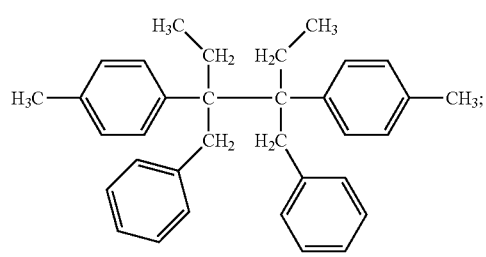

Structure VI 3,4-diethyl-3,4-di(dimethylphenyl) hexane (Structure VII):

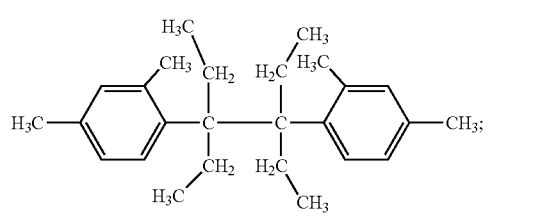

Structure VII and, 3,4-dibenzyl-3,4-diphenyl hexane (Structure VIII):

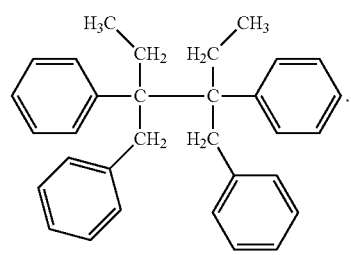

Structure VIII

In one embodiment the C—C initiator is of Structure III. In one embodiment the C—C initiator is of Structure IV.

Other C—C initiators include those of Structure 1, and described in such publications as WO 2012/096962, WO 2012/074812, US 2010/0108357, EP 1 944 327, U.S. Pat. Nos. 5,268,440, 6,967,229 and US 2006/0047049. The C—C initiators can be used alone or in combination with one another. In one embodiment, the C—C free-radical initiator has a decomposition temperature of greater than or equal to ($\geq$)125° C., or $\geq$130° C., or $\geq$135° C., or $\geq$140° C., or ≥145° C., or ≥150° C., based on DSC measurements. In one embodiment, the C—C free-radical initiator has a decomposition temperature of less than or equal to (≤)230° C., or ≤225° C., or ≤220° C., or ≤215° C., or ≤210° C., or ≤205° C., based on DSC measurements.

In one embodiment, the C—C free-radical initiator is present in an amount greater than, or equal to, 0.001 grams per kilogram (g/kg), further greater than, or equal to, 0.005 g/kg, further greater than, or equal to, 0.008 g/kg, further greater than, or equal to, 0.01 g/kg, of the ethylene-based polymer (to be subjected to the thermal treatment and contacted with the free radical initiators of (A) and (B) above, etc.). While the only limitation on the maximum amount of C—C initiator, used in the practice of this invention, is a function of process economics and efficiency, typically the maximum amount of C—C initiator, used in the practice of this invention, does not exceed 2 g/kg. In an embodiment, two or more C—C free radical initiators may be used in combination with one another. In those embodiments, in which the C—C initiator is used in combination with one or more other C—C initiators, only one of the C—C initiators must have at least one of $R_2$ and $R_5$, and at least one of $R_3$ and $R_6$ as a hydrocarbyl group of at least two carbon atoms. In such embodiments, a C—C initiator of Structure I preferably comprises at least 25 wt %, preferably at least 50 wt %, more preferably more than 50 wt % and even more preferably at least 75 wt %, of the total amount of C—C initiator used in the process.

Free Radical Initiators Other Than C—C Free Radical Initiators (Non-C—C Free Radical Initiators)

The free radical initiators, other than the C—C free radical initiators (i.e., non-C—C free radical initiators), include any compound, or mixture of compounds, that produce a free radical available for reacting with the ethylene-based polymers of this invention. These compounds include, but are not limited to, organic and inorganic peroxides, azo compounds, sulfur compounds, halogen compounds and sterically hindered hydroxylamine esters. Representative organic peroxides include 1,1-di-t-butyl peroxy-3,3,5-trimethylcyclohexane; dicumyl peroxide; 2,5-dimethyl-2,5-di(t-butyl peroxy) hexane; t-butyl-cumyl peroxide; di-t-butyl peroxide; and 2,5-dimethyl-2,5-di-(t-butyl peroxy) hexyne. In one embodiment, the non-C—C free radical initiator is a sterically hindered hydroxylamine ester, such as CGX CR 946 available from BASF. Additional teachings regarding organic peroxide initiators are available in the *Handbook of Polymer Foams and Technology*, pp. 198-204, edited by D. Klempner and K. C. Frisch, Hanser Publishers, Munich (1991). In an embodiment, two or more non-C—C free radical initiators may be used in combination with one another.

In one embodiment, the non-C—C free-radical initiator is present in an amount greater than, or equal to, 0.001 grams per kilogram (g/kg), further greater than, or equal to, 0.005 g/kg, further greater than, or equal to, 0.008 g/kg, further greater than, or equal to, 0.01 g/kg, of the ethylene-based polymer (to be subjected to the thermal treatment (e.g., extrusion) and contacted with the free radical initiators of (A) and (B) above, etc.). While the only limitation on the maximum amount of non-C—C initiator used, in the practice of this invention, is a function of process economics and efficiency, typically the maximum amount of C—C initiator does not exceed 1 g/kg of the ethylene-based polymer (to be subjected to the thermal treatment and contacted with the free radical initiators of (A) and (B) above, etc.).

In one embodiment, the non C—C initiator is present from 10 ppm, or 25 ppm, or 50 ppm, or 100 ppm, to 500 ppm, or 1,000 ppm, or 5,000 ppm, or 10,000 ppm, based on the weight ethylene-based polymer. In a further embodiment, the non C—C initiator has a one-hour half-life decomposition temperature from 110° C. to 180° C.

Combination of C—C and Non-C—C Free Radical Initiators

The C—C free radical initiator and non-C—C free radical initiator are typically present in the process of this invention, at a C—C initiator to non-C—C initiator weight ratio from 3.0 to 0.5, more typically from 2.5 to 0.8 and even more typically from 2.0 to 1.0.

In one embodiment, the total amount of free radical initiator, used in the practice of this invention, i.e., the combined amount of all C—C free radical initiators and all non-C—C free radical initiators, is greater than, or equal to, 0.002 grams per kilogram (g/kg), further greater than, or equal to, 0.01 g/kg, further greater than, or equal to, 0.016 g/kg, further greater than, or equal to, 0.02 g/kg, of the ethylene-based polymer (to be subjected to the thermal treatment and contacted with the free radical initiators of (A) and (B) above, etc.). While the only limitation on the maximum combined amount of all C—C free radical initiators and all non-C—C free radical initiators, used in the practice of this invention, is a function of process economics and efficiency, typically the maximum combined amount of C—C and non-C—C initiators, used in the practice of this invention, does not exceed 3.0 g/kg, more typically does not exceed 2.5 g/kg, and even more typically does not exceed 2.2 g/kg, of the ethylene-based polymer.

Ethylene-Based Polymer

In one embodiment, the ethylene-based polymer has a density, as determined according to ASTM D792, in the range from 0.855 to 0.970 g/cm$^3$, further from 0.865 g/cm$^3$ to 0.970 g/cm$^3$, and a melt index, $I_2$, as determined according to ASTM D1238 (2.16 kg, 190° C.), in the range of from 0.1 g/10 min to 1500 g/10 min. In one embodiment, the ethylene-based polymer has a density from 0.865 to 0.930 g/cc, or 0.865 to 0.920 g/cc, or 0.865 to 0.910 g/cc, or 0.865 to 0.900 g/cc (1 cc=1 cm$^3$). In one embodiment, the ethylene-based polymer has a density from 0.865 to 0.895 g/cc, or 0.865 to 0.890 g/cc, or 0.865 to 0.885 g/cc, or 0.865 to 0.880 g/cc (1 cc=1 cm$^3$).

In one embodiment, the ethylene-based polymer has a melt index (I2) from 0.1 to 100 g/10 min, or from 0.5 to 50 g/10 min, or from 1.0 to 20 g/10 min, or from, 1.0 to 10 g/10 min. In one embodiment, the ethylene-based polymer has a melt index (I2) from 1.0 to 100 g/10 min, or from 1.5 to 50 g/10 min, or from 2.0 to 40 g/10 min, or from 2.5 to 30 g/10 min, or from 3.0 to 20 g/10 min, or from 3.5 to 15 g/10 min, or from 4.0 to 10 g/10 min.

The ethylene-based polymer can be a homopolymer of ethylene, or an interpolymer or a copolymer of ethylene and a minor (less than 50 wt %, or less than 45 wt %, or less than 40 wt %, or less than 35 wt %, or less than 30 wt %, or less than 20 wt %, based on the weight of the polymer) amount of one or more alpha-olefins of 3 to 20 carbon atoms, preferably of 3 to 12 carbon atoms and more preferably 3 to 8 carbon atoms, and, optionally, a diene or a mixture; or blend of such homopolymers and copolymers. The mixture can be either an in situ blend or a post-reactor (or mechanical) blend. Exemplary alpha-olefins include propylene, 1-butene, 1-hexene, 4-methyl-1-pentene and 1-octene, and further propylene, 1-butene, 1-hexene and 1-octene, and further 1-butene, 1-hexene and 1-octene, and further 1-butene and 1-octene.

In one embodiment, the ethylene-based polymer is an interpolymer or a copolymer of ethylene and a minor (less than 50 mole %, or less than 45 mole %, or less than 40 mole %, or less than 35 mole %, or less than 30 mole %, or less than 20 mole %, based on total moles of polymerizable monomers in the polymer) amount of one or more alpha-olefins of 3 to 20 carbon atoms, preferably of 3 to 12 carbon atoms and more preferably 3 to 8 carbon atoms, and, optionally, a diene or a mixture or blend of such homopolymers and copolymers. The mixture can be either an in situ blend or a post-reactor (or mechanical) blend. Exemplary alpha-olefins include propylene, 1-butene, 1-hexene, 4-methyl-1-pentene and 1-octene, and further propylene, 1-butene, 1-hexene and 1-octene, and further 1-butene, 1-hexene and 1-octene, and further 1-butene and 1-octene.

The ethylene-based polymer can be homogeneous or heterogeneous. Homogeneous ethylene-based polymers typically have a polydispersity (Mw/Mn), before contact with the free radical initiators and functionalization agent, of about 1.5 to about 3.5, an essentially uniform comonomer distribution, and a single, relatively low melting point, as measured by differential scanning calorimetry (DSC). The heterogeneous ethylene-based polymers typically have a polydispersity greater than 3.5 and lack a uniform comonomer distribution. The Mw is the weight average molecular weight, and the Mn is the number average molecular weight, both expressed in grams per mole (g/mol).

In one embodiment, the ethylene-based polymer has a density from 0.855 to 0.960 g/cc, or from 0.860 to 0.965 g/cc. In a further embodiment, the polymer has an $I_2$ from 0.1 to 25 g/10 min. All individual values and subranges from 0.860 to 0.965 g/cc are included herein and disclosed herein; for example, the density of the ethylene-based polymer can be from a lower limit of 0.860, 0.870, 0.890, 0.910, 0.930, or 0.950 g/cc to an upper limit of 0.880, 0.900, 0.920, 0.940 or 0.965 g/cc (1 cc=1 cm$^3$). For example, the ethylene-based polymer density may be in the range from 0.860 to 0.965 g/cc, or in the alternative, the ethylene-based polymer density may be in the range from 0.900 to 0.965 g/cc, or in the alternative, the ethylene-based polymer density may be in the range from 0.860 to 0.900 g/cc, or in the alternative, the ethylene-based polymer density may be in the range from 0.885 to 0.945 g/cc. All individual values and subranges of an $I_2$ from 0.1 to 25 g/10 min are included herein and disclosed herein; for example the $I_2$ of the ethylene-based polymer can be from a lower limit of 0.1, 1, 5, 10, 15, or 20 g/10 min to an upper limit of 0.5, 3, 8, 13, 18, 21 or 25 g/10 min. For example, the $I_2$ of the ethylene-based polymer may be in the range from 0.1 to 25 g/10 min, or in the alternative, the $I_2$ of the ethylene-based polymer may be in the range from 7 to 25 g/10 min, or in the alternative, the $I_2$ of the ethylene-based polymer may be in the range from 0.1 to 10 g/10 min, or in the alternative, the $I_2$ of the ethylene-based polymer may be in the range from 5 to 15 g/10 min. In a particular embodiment, the ethylene-based polymer has a density from 0.865 to 0.900 g/cc and an $I_2$ from 0.1 to 20 g/10 min.

The ethylene-based polymer may be made by any acceptable process, including for example, gas phase, slurry, or solution polymerization processes.

The ethylene-based polymer may comprise a combination of two or more embodiments as described herein. The first composition may comprise a combination of two or more embodiments as described herein.

An inventive composition may comprise a combination of two or more embodiments disclosed herein.

Functionalization Agent

The functionalization agents used in the practice of this invention are radically graftable species, typically containing at least one heteroatom, that can be attached (bonded) to the ethylene-based polymer of the first composition. These species include unsaturated molecules, each containing at least one heteroatom (for example, O and N). These species include, but are not limited to, maleic anhydride, dibutyl maleate, dicyclohexyl maleate, diisobutyl maleate, diocta-decyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds.

In one embodiment, the functionalization agent comprises an acid and/or anhydride group. In one embodiment, the functionalization agent comprises an anhydride group.

Other radically graftable species may be attached to the polymer, individually, or as short-to-longer grafts. These species include, but are not limited to, methacrylic acid; acrylic acid; Diels-Alder adducts of acrylic acid; methacrylates including methyl, ethyl, butyl, isobutyl, ethylhexyl, lauryl, stearyl, hydroxyethyl, and dimethylaminoethyl; acrylates including methyl, ethyl, butyl, isobutyl, ethylhexyl, lauryl, stearyl, and hydroxyethyl; glycidyl methacrylate and vinyl chloride.

Mixtures of radically graftable species that comprise at least one of the above species may be used, with styrene/maleic anhydride and styrene/acrylonitrile as illustrative examples.

In one embodiment, the present invention provides maleic anhydride-grafted ethylene interpolymers. Preferably, the maleic anhydride-grafted ethylene interpolymers are formed from ethylene/α-olefin interpolymers (base polymers).

Composition Comprising the Functionalized Ethylene-Based Polymer

The composition comprising the functionalized ethylene-based polymer may comprise a combination of two or more embodiments as described herein.

In one embodiment, the functionalized ethylene-based polymer is a maleic anhydride functionalized ethylene-based polymer, and further a maleic anhydride grafted ethylene-based polymer.

In one embodiment, the functionalized ethylene-based polymer has a melt index (I2) greater than, or equal to, 0.1 g/10 min, or greater than, or equal to, 0.5 g/10 min, or greater than, or equal to, 1.0 g/10 min. In a further embodiment, the functionalized ethylene-based polymer is a maleic anhydride functionalized ethylene-based polymer, and further a maleic anhydride grafted ethylene-based polymer.

In one embodiment, the functionalized ethylene-based polymer has a melt index (I2) less than, or equal to, 200 g/10 min, or less than, or equal to, 100 g/10 min, or less than, or equal to, 50 g/10 min, or less than, or equal to, 20 g/10 min, or less than, or equal to, 5 g/10 min. In a further embodiment, the functionalized ethylene-based polymer is a maleic anhydride functionalized ethylene-based polymer, and further a maleic anhydride grafted ethylene-based polymer.

In one embodiment, the functionalized ethylene-based polymer has a molecular weight distribution (Mw/Mn) from 1.8 to 3.0, or from 1.9 to 2.8, or from 2.0 to 2.5, or from 2.1 to 2.3. In a further embodiment, the functionalized ethylene-based polymer is a maleic anhydride functionalized ethylene-based polymer, and further a maleic anhydride grafted ethylene-based polymer.

In one embodiment, the functionalized ethylene-based polymer has a density from 0.860 to 0.900 g/cc, or from 0.862 to 0.890 g/cc, or from 0.865 to 0.880 g/cc. In a further embodiment, the functionalized ethylene-based polymer is a maleic anhydride functionalized ethylene-based polymer, and further a maleic anhydride grafted ethylene-based polymer.

In one embodiment, the ethylene-based polymer has a viscosity at 0.1 rad/sec and 190° C., from 2000 to 6000 Pa·sec, or from 2500 to 5500 Pa·sec, or from 3000 to 5000 Pa·sec, or from 3500 to 4500 Pa·sec. In a further embodiment, the functionalized ethylene-based polymer is a maleic anhydride functionalized ethylene-based polymer, and further a maleic anhydride grafted ethylene-based polymer.

In one embodiment, the functionalized ethylene-based polymer as a rheology ratio (V0.1/V100, at 190° C.; where V100 is the viscosity (in Pa·sec) at 100 rad/sec at 190° C.) from 4.0 to 10.0, or from 4.5 to 9.5, or from 5.0 to 9.0, or from 5.5 to 9.0, or from 6.0 to 8.5. In a further embodiment, the functionalized ethylene-based polymer is a maleic anhydride functionalized ethylene-based polymer, and further a maleic anhydride grafted ethylene-based polymer.

In one embodiment, the functionalized ethylene-based polymer has a tan delta from 3.0 to 7.0, or from 3.5 to 6.5, or from 4.0 to 6.0, or from 4.0 to 5.5. In a further embodiment, the functionalized ethylene-based polymer is a maleic anhydride functionalized ethylene-based polymer, and further a maleic anhydride grafted ethylene-based polymer.

In one embodiment, the functionalized ethylene-based polymer is a maleic anhydride grafted ethylene-based polymer. In a further embodiment, the maleic anhydride-grafted ethylene-based polymer as formed from an ethylene-based interpolymer having a molecular weight distribution from about 1 to 5, preferably from about 1 to 4, and more preferably from about 1 to 3.5, or from about 1 to 3. In another embodiment, the maleic anhydride-grafted ethylene-based polymers has a melt viscosity from 2,000 cP to 50,000 cP (at 350° F. (177° C.)). Melt viscosity is measured using a Brookfield viscometer at 350° F. (177° C.), as discussed below.

In one embodiment, the maleic anhydride-grafted ethylene-based polymers has a melt viscosity less than 50,000 cP, preferably less than 40,000 cP, and more preferably less than 30,000 cP, at 350° F. (177° C.). In another embodiment, the maleic anhydride-grafted ethylene-based polymers are formed from ethylene interpolymers having a molecular weight distribution from about 1 to 5, preferably from about 1 to 4, and more preferably from about 1 to 3.5 or about 1 to 3. In another embodiment, the maleic anhydride-grafted ethylene-based polymers have a melt viscosity from 2,000 cP to 50,000 cP (at 350° F. (177° C.)). Melt viscosity is measured using a Brookfield viscometer at 350° F. (177° C.). In another embodiment, the maleic anhydride-grafted ethylene-based polymers have a number average molecular weight from 4,000 to 30,000, preferably from 5,000 to 25,000, and more preferably from 5,000 to 15,000 grams per mole (g/mol). In another embodiment, the maleic anhydride-grafted ethylene-based polymers have a weight average molecular weight from 8,000 to 60,000, preferably from 10,000 to 50,000, and more preferably from 12,000 to 30,000, g/mol. In another embodiment, the maleic anhydride-grafted ethylene-based polymers have density from 0.855 g/cm$^3$ to 0.930 g/cm$^3$, and preferably from 0.860 g/cm$^3$ to 0.900 g/cm$^3$, and more preferably from 0.865 g/cm$^3$ to 0.895 g/cm$^3$. Preferably, the maleic anhydride-grafted ethylene interpolymer is formed from an ethylene/α-olefin interpolymer (base polymer).

In one embodiment, the amount of functionalization agent, e.g., maleic anhydride, used in the process of this invention is greater than, or equal to, 0.5 weight percent, based on the total weight of the reactive composition, and the weight ratio of functionalization agent to initiator, is from 10:1 to 500:1, preferably from 20:1 to 400:1, and more preferably from 30:1 to 300:1. In another embodiment, the weight ratio of functionalization agent to initiator, is from 10:1 to 50:1. Preferably, the maleic anhydride-grafted ethylene interpolymer is formed from an ethylene/α-olefin interpolymer (base polymer).

In another embodiment, the amount of functionalization agent, e.g., maleic anhydride, used in the process of this invention, is less than, or equal to, 10 weight percent (based on the weight of the reactive composition), preferably less than 5 weight percent, and more preferably from 0.5 to 10 weight percent, and even more preferably from 0.5 to 5 weight percent.

In one embodiment, the amount of functionalization agent, e.g., maleic anhydride, grafted onto the ethylene-based polymer chain (for example, ethylene/α-olefin interpolymer) is greater than 0.05 weight percent (based on the weight of the ethylene-based polymer), as determined by titration analysis, FTIR analysis, or any other appropriate method. In a further embodiment, this amount is greater than 0.25 weight percent, and in yet a further embodiment, this amount is greater than 0.5 weight percent. In a preferred embodiment, 0.1 weight percent to 5 weight percent of functionalization agent is grafted. Preferably, the functionalization agent-grafted ethylene-based polymer is formed from maleic anhydride and an ethylene/α-olefin interpolymer (base polymer).

The inventive composition may comprise a combination of two or more embodiments as described herein.

The functionalized ethylene-based polymer may comprise a combination of two or more embodiments as described herein.

Antioxidants

The composition comprising a functionalized ethylene-based polymer may comprise primary and secondary antioxidants. Primary antioxidants are antioxidants used to protect the finished product. These antioxidants are typically phenolic based. In one embodiment, the composition further comprises a secondary antioxidant, and further a phosphite antioxidant or a thioester antioxidant. Secondary antioxidants are antioxidants used to protect the polymer during processing. These antioxidants are typically phosphites and thioesters. In the context of this invention, examples of primary antioxidants include, but are not limited to, IRGANOX 1010 (pentaerythritol tetrakis(3-(3,5-di-tert-butyl-4-hydroxyphenyl)propionate), and IRGANOX 1076 (octadecyl 3,5-di-(tert)-butyl-4-hydroxyhydrocinnamate), both available from BASF. In the context of this invention, examples of secondary antioxidants include, but are not limited to, IRGAFOS 168 (tris(2,4-di-tert-butylphenyl) phosphite) and IRGAFOS 126 (a phosphite antioxidant), both available from BASF, and SONGNOX DLTDP and DSTDP (thioester antioxidants) both available from Vanderbilt Chemicals.

In one embodiment, the ethylene-based polymer does not comprise a primary antioxidant. In one embodiment, the ethylene-based polymer comprises less than 50, or 40, or 30, or 20, or 10, or 5, or 3, or 2 or 1 parts per million (ppm) of a primary antioxidant. In one embodiment, the ethylene-based polymer comprises a secondary antioxidant. In one embodiment, the ethylene-based polymer comprises both a primary and a secondary antioxidant.

The composition comprising a functionalized ethylene-based polymer, may optionally comprises from 500 to 2,000 ppm of a secondary antioxidant based on the total polymeric composition weight. Secondary antioxidants prevent formation of additional free radicals by decomposing the peroxide into thermally stable, non-radical, non-reactive products by means of an efficient alternative to thermolysis and generation of free radicals. All individual values and subranges from 500 to 2,000 ppm are included herein and disclosed herein; for example, the amount of secondary antioxidant can be from a lower limit of 500, 700, 900, 1100, 1300, 1500, 1700 or 1900 ppm to an upper limit of 600, 800, 1000, 1200, 1400, 1600, 1800 or 2000 ppm. For example, when present, the secondary antioxidant may be present in an amount from 500 to 2,000 ppm, or in the alternative, the secondary antioxidant may be present in an amount from 1,250 to 2,000 ppm, or in the alternative, the secondary antioxidant may be present in an amount from 500 to 1,250 ppm, or in the alternative, the secondary antioxidant may be present in an amount from 750 to 1,500 ppm.

Articles of Manufacture

The composition comprising the functionalized ethylene-based polymer can be used to manufacture, among other things, various extruded and molded articles. Examples of such articles include film, coatings, wire and cable coverings, sheets, pipes, blow-molded and injection molded parts for the automotive and consumer products industries, and the like. Other examples of application areas are compounds and blends, adhesives, profile extrusion, extrusion coating, and thermoplastic powder coating.

Definitions

Unless stated to the contrary, implicit from the context, or customary in the art, all parts and percents are based on weight, and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

"Comprising", "including", "having" and like terms mean that the composition, process, etc. is not limited to the components, steps, etc. disclosed, but rather can include other, undisclosed components, steps, etc. In contrast, the term "consisting essentially of" excludes from the scope of any composition, process, etc. any other component, step etc., excepting those that are not essential to the performance, operability or the like of the composition, process, etc. The term "consisting of" excludes from a composition, process, etc., any component, step, etc., not specifically disclosed. The term "or", unless stated otherwise, refers to the disclosed members individually as well as in any combination.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene-based interpolymer," as used herein, refers to an interpolymer that comprises, in polymerized form, a majority amount of ethylene monomer (based on the weight of the interpolymer), and at least one comonomer.

The term "ethylene-based copolymer," as used herein, refers to a polymer that comprises, in polymerized form, a majority amount of ethylene monomer (based on the weight of the copolymer), and one comonomer, as the only two monomer types.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to an copolymer that comprises, in polymerized form, a majority amount of ethylene monomer (based on the weight of the copolymer), and an α-olefin, as the only two monomer types.

"Functionalized ethylene-based polymer" and like terms, as used herein, refer to an ethylene-based polymer that has been reacted with at least the following: (i) a carbon-carbon (C—C) free radical initiator, (ii) a non-carbon-carbon (non-C—C) free radical initiator, and (iii) a functionalization agent. In a preferred embodiment, the ethylene-based polymer, which may contain small (ppm) amounts of one or more stabilizers, for example antioxidant(s), is reacted only with the following: (i) a carbon-carbon (C—C) free radical initiator, (ii) a non-carbon-carbon (non-C—C) free radical initiator, and (iii) a functionalization agent.

"Hydrocarbyl," "hydrocarbon," and like terms, refer to a radical consisting of carbon and hydrogen atoms. Nonlimiting examples of hydrocarbyl radicals include alkyl (straight chain, branched or cyclic), aryl (e.g., phenyl, naphthyl, anthracenyl, biphenyl), aralkyl (e.g., benzyl), and the like.

"Aliphatic hydrocarbon," "aliphatic hydrocarbyl," and like terms, as known in the art, refer to a branched or unbranched or cyclic, saturated or unsaturated, aliphatic (non-aromatic) hydrocarbon radical. Nonlimiting examples of suitable aliphatic radicals include methyl, ethyl, n-propyl, i-propyl, 2-propenyl (or allyl), vinyl, n-butyl, t-butyl, i-butyl (or 2-methylpropyl), cyclopentyl, cyclohexyl, and the like. In one embodiment, the aliphatic radicals are alkyl radicals of 1 to 24 carbon atoms. "Aryl" and like terms refer to an aromatic radical, which may be a single aromatic ring, or multiple aromatic rings that are fused together, linked covalently, or linked to a common group such as a methylene or ethylene moiety. Nonlimiting examples of aromatic ring(s) include phenyl, naphthyl, anthracenyl, biphenyl, among others. In one embodiment, the aryl radicals typically comprise 6 to 20 carbon atoms.

Test Methods

Density is measured according to ASTM D792.

Melt Index, $I_2$, is measured according to ASTM D1238 (2.16 kg, 190° C.).

Molecular Weight Distribution

The chromatographic system consisted of a PolymerChar GPC-IR (Valencia, Spain) high temperature GPC chromatograph equipped with an internal IR5 infra-red detector (IR5).

The autosampler oven compartment was set at 160° Celsius, and the column compartment was set at 150° Celsius. The columns used were three Agilent "Mixed B" 30 cm 10-micron linear mixed-bed columns and a 10-um pre-column. The chromatographic solvent used was 1,2,4-trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at "0.025 grams in 50 milliliters of solvent" for molecular weights equal to, or greater than, 1,000,000, and at "0.05 grams in 50 milliliters of solvent" for molecular weights less than 1,000,000. The polystyrene standards were dissolved at 80 degrees Celsius, with gentle agitation, for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad (EQ1),$$

where M is the molecular weight, A has a value of 0.4315, and B is equal to 1.0.

A fifth order polynomial was used to fit the respective polyethylene-equivalent calibration points. A small adjustment to A (from approximately 0.415 to 0.44) was made to correct for column resolution and band-broadening effects, such that NIST standard NBS 1475 was obtained at 52,000 g/mole (Mw).

The total plate count of the GPC column set was performed with EICOSANE (prepared at "0.04 g in 50 milliliters of TCB (1,2,4-trichlorobenzene)," and dissolved for 20 minutes with gentle agitation. The plate count (Equation 2) and symmetry (Equation 3) were measured on a 200 microliter injection according to the following equations:

$$\text{Plate Count} = 5.54 * \left( \frac{(RV_{Peak\ Max})}{\text{Peak Width at } \frac{1}{2} \text{ height}} \right)^2, \quad (EQ2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}, \quad (EQ3)$$

where RV is the retention volume in milliliters, and the peak width is in milliliters, the Peak max is the maximum position of the peak, the "one tenth height" is ⅒ height of the peak maximum, and where rear peak refers to the peak tail at retention volumes later than the peak max retention volume, and where front peak refers to the peak front at retention volumes earlier than the peak max retention volume. The plate count for the chromatographic system should be greater than 24,000, and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph, according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn(GPC) = \frac{\sum_i IR_i}{\sum_i (IR_i / M_{polyethylene_i})}, \quad (EQ4)$$

$$Mw(GPC) = \frac{\sum_i (IR_i * M_{polyethylene_i})}{\sum_i IR_i}, \quad (EQ5)$$

$$Mz(GPC) = \frac{\sum_i (IR_i * M_{polyethylene_i}^2)}{\sum_i (IR_i * M_{polyethylene_i})}. \quad (EQ6)$$

In order to monitor the deviations over time, a flowrate marker (decane) was introduced into each sample via a micropump controlled with the PolymerChar GPC-IR system. This flowrate marker (FM) was used to linearly correct the pump flowrate ($\text{Flowrate}_{(nominal)}$) for each sample by RV alignment of the respective decane peak within the sample ($RV_{(FM\ Sample)}$) to that of the decane peak within the narrow standards calibration ($RV_{(FM\ Calibrated)}$). Any changes in the time of the decane marker peak were then assumed to be related to a linear-shift in flowrate ($\text{Flowrate}_{(effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−2% of the nominal flowrate.

Flowrate(effective)=Flowrate(nominal)*(RV(FM Calibrated)/RV(FM Sample)) (EQ7)

Dynamic Mechanical Spectroscopy (DMS)

Resins were compression-molded into "3 mm thick×1 inch" circular plaques at 350° F. (177° C.), for five minutes, under 25,000 lb of force, in air. The sample was then taken out of the press, and placed on a counter to cool. A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of "2 mm", the sample trimmed (extra sample that extends beyond the circumference of the "25 mm diameter" plate was removed), and then the test was started. The method has an additional five minute delay built in, to allow for temperature equilibrium. The experiments were performed at 190° C. over a frequency range of 0.1 to 100 radians per second (rad/s). The strain amplitude was constant at 10%. The complex viscosity η*, tan (δ) or tan delta at 0.1 rad/s, viscosity at 0.1 rad/s (V0.1), the viscosity at 100 rad/s (V100), and the viscosity ratio (V0.1N100) were calculated from the data.

Gel Content Measurement

The polymer composition was fed to an extruder. Extruder: Model OCS ME 19 available from OCS Optical Control Systems GmbH Wullener Feld 36, 58454 Witten, Germany or equivalent. Parameter Mixing Screw L/D 25/1. Coating Chrome Compression ratio 3/1. Feed Zone 10D. Transition Zone 3D. Metering Zone 9D. Mixing Zone 3D. Cast Film Die: ribbon die, 150×0.5 mm, available from OCS Optical Control Systems GmbH, or equivalent.

Air Knife: OCS air knife to pin the film on the chill roll, available from OCS Optical Control Systems GmbH, or equivalent. Cast Film Chill Rolls and Winding Unit: OCS Model CR-8, available for OCS Optical Control Systems GmbH, or equivalent.

TABLE 1

Conditions of Gel Measurement on OCS

| | | |
|---|---|---|
| Throat Set Temperature | ° C. | 25 ± 3 |
| Zone 1 Set Temperature | ° C. | 179 ± 5 |
| Zone 2 Temperature | ° C. | 191 ± 5 |
| Zone 3 Set Temperature | ° C. | 204 ± 5 |
| Clamp Ring Set Temperature | ° C. | 216 ± 5 |
| Adapter Set Temperature | ° C. | 221 ± 5 |
| Die Set Temperature | ° C. | 2221 ± 5 |
| Screw Type | | Mixing |
| Screw Speed | RPM | 70 ± 2 |
| Chill Speed | m/min | 3 ± 1 |
| Chill Temp. | ° C. | 20 ± 2 |
| Tension Speed | m/min | 4 ± 2 |
| Winder Torque | N | 4 ± 1 |
| Lab Temperature | ° C. | 23 ± 2 |
| Lab Humidity | % | <70 |
| Width | mm | 125 ± 18 |
| Thickness | μm | 76 5 |

Gel Counter (camera plus computer processor): OCS FSA-100 ("25 micron pixel resolution" camera) line scan gel counter consisting of a lighting unit, a CCD detector and an image processor with the Gel counter software version 5.0.4.6, available from OCS Optical Control Systems GmbH, or equivalent. One analysis inspects 25 parcels, where a parcel is defined as 24.6 cm³ of film, or 0.324 m² for a film thickness of 76 μm.

Gel Count: The gel count is the total number of gels detected by the gel camera, for the total of 25 parcels; for the counted gels, each gel is further classified, based on the equivalent circular diameter of the area measured, into the following categories: <100 micron; between 100 and 150 microns (100 to less than 150); between 150 and 200 microns (150 to less than 200); between 200 and 400 microns (200 to less than 400); between 400 and 800 microns (400 to less than 800); between 800 and 1600 microns (800 to less than 1600); and >1600 micron. The size of each gel is determined by calculating the diameter of a circle with an area equivalent to the measured gel area—this is known as the "equivalent circular diameter" of the gel.

The GI 200 is defined as "the sum of the areas of all gels with diameter >200 μm for the 25 parcels, divided by 25," for the final GI 200 value. As discussed above, the diameter of a gel is determined as the diameter of a circle having equivalent area.

MAH Grafting Level by Fourier Transform Infrared (FTIR)

Sample preparation: MAH-g-polyethylene pellets were dried in a vacuum oven at 150° C., for two hours at 100 kPa of vacuum, in order to regenerate hydrolyzed MAH. The dried samples were pressed into thin films using a heated Carver hydraulic press at 190° C. at 40000 lbs of force, for 30 seconds, and then quenched between platens cooled to 15° C.

FTIR Measurement: FTIR spectra were collected using a Thermo Nicolet Nexus 470 bench in transmission mode over the range 400 to 4000 cm$^{-1}$, at a resolution of 4 cm$^{-1}$. The test consisted of 128 background scans, in air, and 128 samples scans. Data analysis was carried out using Thermo Macros Basic 8.0 and OMNIC software package. Three films from each sample were scanned and the average reported.

The wt % of g-MAH was determined from the ratio of the height of the peak at ca. 1790 cm$^{-1}$ corresponding to the carbonyl stretch of the anhydride, to the height at 2751 cm$^{-1}$, as follows:

$$\text{wt \% } MAH = 0.0313 \times \frac{(\text{peak height @ ca. 1790 cm}^{-1})}{(\text{peak height @ ca. 2751 cm}^{-1})} +$$

$$0.2145 \times \frac{(\text{peak height @ ca. 1790 cm}^{-1})}{(\text{peak height @ ca. 2751 cm}^{-1})} + 0.0645$$

DSC Method for the Determination of the Decomposition Temperature of the C—C Free-Radical Initiator Differential scanning calorimetry (DSC) is performed on a TA instruments Q200 calorimeter at a ramp rate of 10° C. from 0 to 400° C., under a nitrogen atmosphere, with a sample size of 7 to 10 milligrams (mg).

Initiator One-Hour Half-Life Determination

Initiator one hour half-life decomposition temperature is determined by differential scanning calorimetry-thermal activity monitoring (DSC-TAM) of a dilute solution of the initiator in monochlorobenzene. Kinetic data of the decomposition of hydroperoxides in monochlorobenzene are determined titrimetrically. The half-life can be calculated by the Arrhenius equation:

$k_d = A \cdot e^{-Ea/RT}$ and $t_{1/2} = \ln 2/k_d$, where $k_d$ is the rate constant for initiator dissociation in s$^{-1}$; A is the Arrhenius frequency factor in s$^{-1}$; Ea is the activation energy for the initiator dissociation in J/mole; R is 8.3142 J/mole K; T is temperature in K (Kelvin); and $t_{1/2}$ is half-life in seconds (s).

Antioxidant Concentration Determination

Determination of IRGAFOS™ 168 and oxidized IRGAFOS™ 168 in polyethylene is performed using total dissolution methodology (TDM). This methodology involves dissolution of 1 g of solid (e.g., polymer) in 25 ml of o-xylene at 130° C. for 30 minutes, followed by precipitation, with cooling, and the addition of 50 ml of methanol. After the precipitation, the extract is filtered, using a syringe filter, into an autosampler vial for analysis by reversed phase liquid chromatography, using the conditions summarized below:

Column: Zorbax Eclipse XDB-C8, 5 μm particle, 4.6× 12.5 mm guard coupled to a Zorbax, Eclipse XDB-C8, 3.5 μm particle, 4.6×50 mm column using an Agilent guard column kit; Column Oven: 50° C.; Detection: UV absorbance at 210 nanometers (nm); Gradient: Solvent A: 50/50 water/acetonitrile, and Solvent B: acetonitrile.

| Time (min) | Flow (mL/min) | % A | % B |
|---|---|---|---|
| 0.0 | 1.9 | 50 | 50 |
| 2.00 | 1.9 | 0 | 100 |
| 6.00 | 1.9 | 0 | 100 |

Data acquisition time: 8 min; Post Run Time: 2 min at 50/50 A/B; Total run time: b10 min with equilibration time; Injection: 10 μL; and Data System: Agilent EZChrom Elite. The concentration of the components are calculated using an external standard calibration procedure. The following examples illustrate the present invention but are not intended to limit the scope of the invention.

EXAMPLES

Resins and Reagents

Resin A (ENGAGE 8200, commercially available from The Dow Chemical Company) is an ethylene/octene copolymer having melt index of 5.0 g/10 min (at 190° C., 2.16 kg ASTM D-1238) and a density 0.870 g/cm$^3$ (ASTM D792). Resin A contains a secondary antioxidant (100 ppm amount).

Synthesis of Representative C—C Free Radical Initiator

Representative preparation of tertiary alcohols: Inside a nitrogen-filled glovebox, ethylmagnesium chloride solution (3.0 M in ether, 32.05 mL, 96.2 mmol) is placed in a jar. One hundred (100) ml of sparged & dried THF is then added to the jar, followed by 0.6 M LaCl$_3$-2(LiCl) in THF (12.3 mL, 7.40 mmol), dropwise, to the magnesium solution (a precipitate may form depending on the choice of magnesium reagent). Once addition is complete, stir for 30 minutes at room temperature (about 23° C.). Add propiophenone (9.9 g, 74.0 mmol) dropwise with stirring, while cooling the reaction vessel with a fan. After 1 hour, the mixture is removed from the nitrogen atmosphere, cooled in an ice bath, and the reaction quenched via slow addition of cold aqueous NH$_4$Cl. The product is extracted with ether, and the organic layers are washed with aqueous sodium bicarbonate, brine, and dried with MgSO$_4$. After removal of the volatiles, NMR is recorded in C6D6.

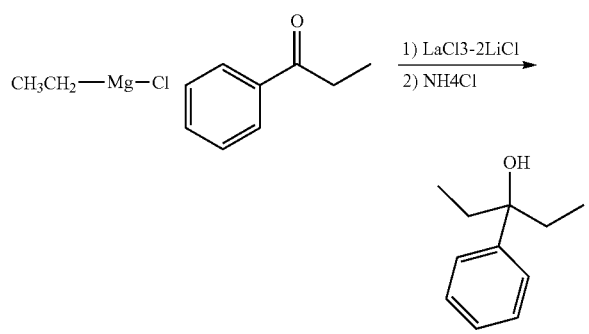

Representative preparation of diphenyl ethane structures: Inside a nitrogen-filled glovebox, TiCl$_3$ (5.75 g, 37.3 mmol), is added, to a jar. To this, is added, 70 ml of anhydrous 1,2-dimethoxyethane. As a 2.0 M solution in THF, lithium aluminum hydride (6.2 mL, 12.4 mmol) is added, slowly over 20 min. while cooling the reaction vessel with a fan. Heat and gas evolution are noted. After stirring for 20 min. at room temperature (about 23° C.), 3-phenyl-3-pentanol (2.03 g, 12.4 mmol) is added dropwise. After addition, the mixture is heated to 65° C. After 3 hrs, the mixture is removed from the nitrogen atmosphere, cooled in an ice bath, and the reaction quenched via slow addition of cold aqueous NH$_4$Cl. The product is extracted with ether, and the organic layers are washed with aqueous sodium bicarbonate, brine, and dried with MgSO$_4$. After removal of the volatiles, NMR is recorded in C6D6.

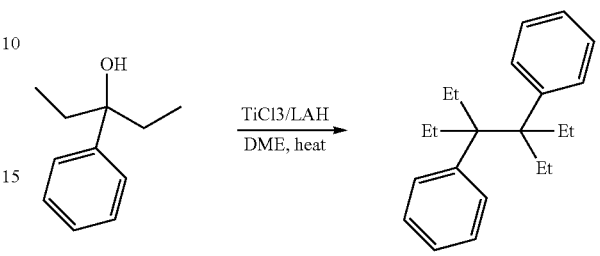

MAH Grafting

The grafting of the maleic anhydride onto Resin A took place in a Krupp Werner & Pfleiderer twin-screw co-rotating extruder system (ZSK-25). The FIGURE shows the layout of the system. The system is comprised of an extruder with 12 barrel sections, 11 of which are independently controlled with electric heating and water cooling; a 25-mm twin-screw a loss-in-weight feeder (KTRON, model KCLQX3); a high-performance liquid chromatography (HPLC) pump (Alltech, model 627) to inject the MAH/MEK/(50/50 mixture radical generator solution; a vacuum system to remove any non-reacted MAH (maleic anhydride) and byproducts; and a Gala Underwater Pelletizer. The length to diameter ratio of the extruder is 48. Before any MAH grafting was started, the extruder was purged with Resin A, for a minimum of one hour, to ensure that the system was clean, before production of materials. An additional purge, for a minimum of one hour, was also done before each functionalization reaction.

In all cases, the KTRON feeder fed the polymer pellets, under a nitrogen purge, into the extruder feed throat (barrel 1). Previous to the trial, the maleic anhydride was dissolved in 2-butanone (methyl ethyl ketone or MEK) in a 1:1 ratio (by mass). An aliquot of such solution was weighed, and the appropriate radical generator added. The amount of radical generator added to each aliquot depended on the formulation established in the design of experiments. The HPLC pump injected the MAH/2-butanone/radical generator solution between the 5th and 6th barrel sections. The vacuum system (comprised of 3 knock-out pots), connected to the devolatilization port in barrel 11, removed the non-reacted MAH, solvent, and byproducts of the reaction. The vacuum system operated at 0.68 bar vacuum. Moreover, a nitrogen stream flowed continuously into the vacuum system, to prevent against hazardous conditions. Finally, the resulting MAH-grafted polymer was pumped, by the extruder, through a two-hole die into the cutting chamber of the Gala LPU underwater pelletizer. The cutting speed ranged from 2800 to 3300 rpm, depending on the pellet size desired. In addition, the water temperature of the pelletizing system was 4.4° C. The total feed rate (9.07 kg/h) and screw speed (350 rpm) were held constant for all samples. The extruder torque load varied from 78-82%. Table 2 summarizes process variables, such as the temperature profile of the extruder, die pressure, specific feed rates of the components, and the like. General conditions and models for the equipment used in grafting a shown in Table 3.

TABLE 2

Extrusion Conditions for MAH Grafting.

| | |
|---|---|
| Total feed rate (kg/h) | 9.07 |
| Screw RPM | 350 |
| Zone #1- Barrel #2 [° C.] | 100 |
| Zone #2 [° C.] | 220 |
| Zone #3 [° C.] | 220 |
| Zone #4 [° C.] | 220 |
| Zone #5 [° C.] | 200 |
| Zone #6 [° C.] | 200 |
| Zone #7 [° C.] | 200 |
| Zone #8 [° C.] | 200 |
| Zone #9 [° C.] | 180 |
| Zone #10 [° C.] | 180 |
| Zone #11-adapter [° C.] | 180 |
| Gala Die [° C.] | 135 |
| Gala Cutter Speed [rpm] | 2000 |
| Gala water temp [° C.] | 4.4 |

TABLE 3

Extruder with L/D of 1:48

| | |
|---|---|
| Manufacturer | Krupp Werner and Pfleiderer |
| Model | ZSK-25 |
| Gear Box | 1:2.5 |
| Max RPM | 1200 |
| # of barrels | 12 |
| Feeding Equipment | Model |
| K-Tron Pellet Feeder | KCL24KQX4 |
| Auxiliary Equipment | Model |
| Underwater Pelletizer | Gala LPU |
| HPLC Alltech | 627 |

Maleic Anhydride Solution Preparation

A 50/50 2-butanone (MEK) and maleic anhydride mixture was prepared by dissolving maleic anhydride briquettes in 2-butanone overnight with a magnetic stir bar in a large 5 L glass jug. Smaller aliquots were poured off into plastic containers (~400 g). The desired concentration of each free radical generator (the C—C radical and the non-C—C radical) was added to generate the level of respective free radical generator reported in Table 6. The resulting mixture was then pumped into barrel 5 of the extruder via an ALLTECH model 627 HPLC pump. The raw materials are shown in Table 4 and Table 5.

TABLE 4

Raw Materials.

| Material Name | CAS number | Supplier |
|---|---|---|
| ENGAGE 8200 | 26221-73-8 | Dow Chemical |
| Maleic Anhydride | 108-31-6 | Sigma Aldrich |
| 2-Butanone (MEK) | 201-159-0 | Sigma Aldrich |
| LUPEROX 101 | 78-63-7 | Sigma Aldrich |

TABLE 5

Radical Generators

| Radical Generators | Abbreviated Name | Mw (g/mol) |
|---|---|---|
| 3,4-diethyl-3,4-diphenyl hexane | DEDPH | 294.5 |
| 3,4-dimethyl-3,4-diphenyl hexane | DMDPH | 266.4 |

The samples are described in Table 6. CE refers to comparative sample and IE to inventive example. All samples in Table 6 were produced using the MAH grafting procedure discussed above. In the first comparative example CE 1, no maleic anhydride was added, but Resin A was passed through the extruder. In CE 2 and CE 3, maleic anhydride grafting was done in the absence of a C—C initiator. In the three inventive examples (IE 1, IE 2, IE 3), maleic anhydride was grafted in the same manner as in CE 2 and CE 3, but different levels of two separate C—C initiators were added. As can be observed, the addition of a C—C initiator improved the overall grafting level of maleic anhydride as reported in Table 6 (higher MAH level measured by FTIR), while reducing the amount of gel formation, and also further lowering the melt index, each as reported in Table 7. The DMS data for these samples also show higher viscosity ratio and lower tan delta for the samples formed using the C—C initiators; and these two rheology features each indicate improved MAH grafting (see Table 8). CE 4 is also included, which is Resin A (not passed through the extruder or with no heat history).

For Table 7, the headings related to gels that are noted in microns, are those in which the counted gels are further classified, based on the equivalent circular diameter of the area measured, and which falls within the following categories: "100 micron column" refers to <100 micron, 150 micron column refers to gels between 100 and 150 microns, 200 micron column refers to gels between 150 and 200 microns, 400 micron column refers to gels between 200 and 400 microns, 800 micron column refers to gels between 400 and 800 microns, 1600 micron column refers to gels between 800 and 1600 microns, and >1600 micron column refers to gels >1600 microns.

TABLE 6

Additional Conditions used for Samples.

| Sample | MAH Used (wt %*) | MAH Level Measured by FTIR (wt %***) | Luperox (ppm**) | DEDPH (ppm**) | DMDP (ppm**) |
|---|---|---|---|---|---|
| CE 1 | 0 | 0 | 0 | 0 | 0 |
| CE 2 | 0.9 | 0.49 | 500 | 0 | 0 |
| CE 3 | 0.9 | 0.43 | 500 | 0 | 0 |
| CE 4 | 0 | 0 | 0 | 0 | 0 |
| IE 1 | 0.9 | 0.66 | 500 | 1,014 | 0 |
| IE 2 | 0.9 | 0.79 | 500 | 0 | 459 |
| IE 3 | 0.9 | 0.57 | 500 | 0 | 917 |

*Weight percent based on weight of the base polymer before functionalization.

**Each ppm based on the weight of the base polymer (before functionalization).

***Weight percent based on weight of the functionalized polymer.

TABLE 7

Melt Index and Gel Data

| Sample | Melt Index | 100 Micron | 150 Micron | 200 Micron | 400 Micron | 800 Micron | 1600 Micron | >1600 Micron | GI 200 |
|---|---|---|---|---|---|---|---|---|---|
| CE 1 | 4.80 | 29,181 | 5,843 | 2,553 | 2,690 | 402 | 17 | 0 | 10.05 |
| CE 2 | 1.75 | 24,007 | 5,141 | 2,297 | 2,511 | 580 | 95 | 3 | 14.48 |
| CE 3 | 2.33 | 34,717 | 8,724 | 3,807 | 3,842 | 527 | 27 | 0 | 13.78 |
| CE 4 | 4.88 | 20,688 | 3,346 | 1,430 | 1,485 | 329 | 29 | 1 | 7.29 |
| IE 1 | 1.35 | 23,334 | 3,108 | 1,250 | 1,243 | 237 | 44 | 0 | 6.48 |
| IE 2 | 1.07 | 23,508 | 3,808 | 1,366 | 1,242 | 217 | 27 | 0 | 5.61 |
| IE 3 | 1.37 | 38,438 | 9,118 | 3,051 | 1,741 | 214 | 12 | 0 | 5.96 |

TABLE 8

DMS Data

| Sample | Viscosity 0.1 rad/s (Pa-s) | Viscosity 1 rad/s (Pa-s) | Viscosity 10 rad/s (Pa-s) | Viscosity 100 rad/s (Pa-s) | Viscosity Ratio | Tan Delta 0.1 rad/s |
|---|---|---|---|---|---|---|
| CE 1 | 1,725 | 1,630 | 1,235 | 681 | 2.5 | 40.1 |
| CE 2 | 3,987 | 2,998 | 1,719 | 726 | 5.5 | 6.0 |
| CE 3 | 3,399 | 2,686 | 1,600 | 704 | 4.8 | 6.4 |
| CE 4 | 1,628 | 1,561 | 1,242 | 708 | 2.3 | 55.5 |
| IE 1 | 3,818 | 2,834 | 1,536 | 625 | 6.1 | 5.3 |
| IE 2 | 4,231 | 2,946 | 1,561 | 618 | 6.8 | 4.2 |
| IE 3 | 3,983 | 2,820 | 1,552 | 641 | 6.2 | 4.5 |

TABLE 9

GPC Data

| Sample | Mn (g/mol) | Mw (g/mol) | Mz (g/mol) | Mw/Mn |
|---|---|---|---|---|
| CE 1 | 37,294 | 75,474 | 127,897 | 2.02 |
| CE 2 | 32,811 | 70,082 | 120,564 | 2.14 |
| CE 3 | 33,761 | 71,124 | 122,057 | 2.11 |
| CE 4 | 37,903 | 75,906 | 125,669 | 2.00 |
| IE 1 | 32,285 | 69,380 | 120,319 | 2.15 |
| IE 2 | 31,794 | 68,731 | 119,323 | 2.16 |
| IE 3 | 32,847 | 69,976 | 120,231 | 2.13 |

What is claimed is:

1. A process to form a composition comprising a functionalized ethylene-based polymer, the process comprising reacting a first composition comprising an ethylene-based polymer with at least the following:
(A) at least one carbon-carbon (C—C) free radical initiator of Structure I:

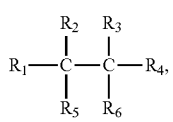

(Structure I)

wherein $R_1$, $R_2$, $R_3$, $R_4$, $R_5$ and $R_6$ are each, independently, hydrogen or a hydrocarbyl group; and
wherein,
(i) at least one of $R_2$ and $R_5$ is a hydrocarbyl group of at least two carbon atoms, and
(ii) at least one of $R_3$ and $R_6$ is a hydrocarbyl group of at least two carbon atoms; and,
(iii) optionally, two or more R groups ($R_1$, $R_2$, $R_3$, $R_4$, $R_5$ and $R_6$) form a ring structure; and
(B) at least one free radical initiator (a non-C—C free radical initiator) other than the carbon-carbon (C—C) free radical initiator of Structure I; and
(C) at least one functionalization agent.

2. The process of claim 1 wherein the first composition further comprises a secondary antioxidant.

3. The process of claim 1, wherein the ethylene-based polymer of the first composition is an ethylene/α-olefin copolymer.

4. The process of claim 1, wherein the C—C free-radical initiator is of Structure II:

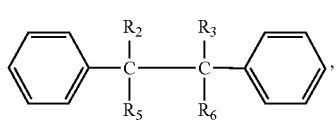

(Structure II)

wherein $R_2$, $R_3$, $R_5$ and $R_6$ are each, independently, hydrogen or a hydrocarbyl group; and
wherein, optionally, two or more R groups ($R_2$, $R_3$, $R_5$ and $R_6$) form a ring structure; and with the provisos that (i) at least one of $R_2$ and $R_5$ is a hydrocarbyl group of at least two carbon atoms, and (ii) at least one of $R_3$ and $R_6$ is a hydrocarbyl group of at least two carbon atoms.

5. The process of claim 1, wherein the C—C free-radical initiator is selected from the group consisting of Structures III-VIII:

3,4-dimethyl-3,4-diphenyl hexane (Structure III)

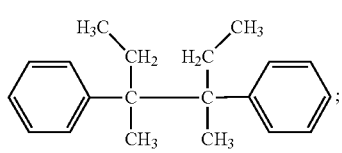

(Structure III)

3,4-diethyl-3,4-diphenyl hexane (Structure IV)

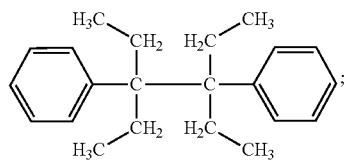
(Structure IV)

2,7-dimethyl-4,5diethyl-4,5-diphenyl octane (DBuDPH) (Structure V)

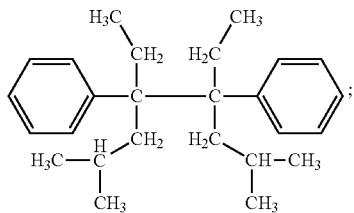
(Structure V)

3,4-dibenzyl-3,4-ditolyl hexane (DBnDTH) (Structure VI)

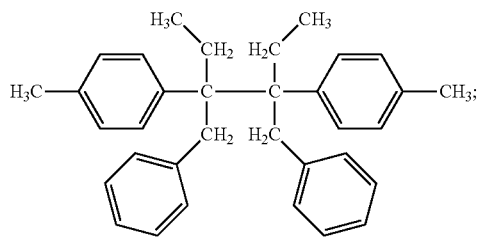
Structure VI 3,4-diethyl-3,4-di(dimethylphenyl) hexane (Structure VII)

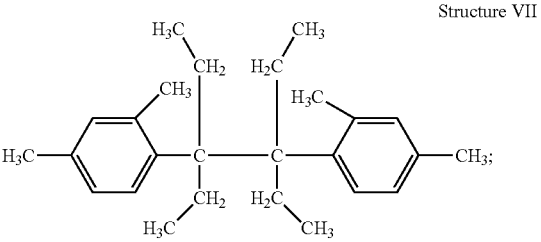 [SMILES: CCC(CC)(c1ccc(C)cc1C)C(CC)(CC)c1ccc(C)cc1C]
Structure VII and
and, 3,4-dibenzyl-3,4-diphenyl hexane (Structure VIII)

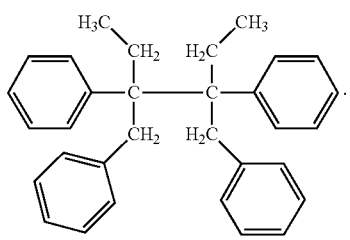
Structure VIII

6. The process of claim 1, wherein the C—C free-radical initiator has a decomposition temperature of greater than, or equal to, (≥) 125° C. based on a DSC measurement.

7. The process of claim 1, wherein at least one of the non-C—C free radical initiators of (B) is one of the following: an inorganic or organic peroxide, an azo compound, a sulfur compound, or a halogen compound.

8. A composition comprising a functionalized ethylene-based polymer made by the process of claim 1.

9. The composition of claim 8, wherein the composition has a GI 200 gel content less than, or equal to, 12, as determined by the GI 200 test method with a film thickness of 76±5 microns.

10. An article comprising at least one component formed from the composition of claim 9.

* * * * *